United States Patent [19]

Dzewaltowski et al.

[11] Patent Number: 4,721,839
[45] Date of Patent: Jan. 26, 1988

[54] COMBINED BORE SEAT FACE GRINDING, EDM AND LAPPING METHOD FOR FINISHING FUEL INJECTOR NOZZLE BODIES

[75] Inventors: Victor F. Dzewaltowski; James Halvorsen, both of Springfield, Vt.; John M. Check, Chelsea, Mich.

[73] Assignee: Ex-Cell-O Corporation, Troy, Mich.

[21] Appl. No.: 866,000

[22] Filed: May 22, 1986

[51] Int. Cl.[4] .......................... B23H 1/00; B23H 9/10
[52] U.S. Cl. ................................ 219/69 M; 239/533.3
[58] Field of Search ............... 219/69 M, 69 V, 69 R, 219/69 E; 408/42–44; 239/533.3; 29/26 A, 28, 33 P, 563, 564

[56] References Cited

U.S. PATENT DOCUMENTS

| | | | |
|---|---|---|---|
| 3,388,232 | 6/1968 | Dreisin | 219/69 M |
| 3,833,312 | 9/1974 | Miles et al. | 29/564 |
| 4,035,904 | 7/1977 | Ishizaka et al. | 29/564 |
| 4,163,313 | 8/1979 | Matsuno et al. | 408/3 |
| 4,419,612 | 12/1983 | Reda et al. | 318/571 |
| 4,612,690 | 9/1986 | Baker | 29/564 |
| 4,626,645 | 12/1986 | Inoue et al. | 29/564 |
| 4,639,568 | 1/1987 | Check et al. | 219/69 M |

FOREIGN PATENT DOCUMENTS

| | | | |
|---|---|---|---|
| 1092333 | 12/1980 | Canada | 29/563 |
| 2804584 | 8/1979 | Fed. Rep. of Germany | 29/563 |
| 788113 | 12/1957 | United Kingdom | 29/563 |
| 1168378 | 7/1985 | U.S.S.R. | 29/563 |

OTHER PUBLICATIONS

"A Real Rough Story", Wijers, 10/1985, vol. VII, No. 5, EDM Digest, pp. 16–22.

Primary Examiner—Philip H. Leung
Assistant Examiner—Geoffrey S. Evans
Attorney, Agent, or Firm—Edward J. Timmer

[57] ABSTRACT

A combined grinding and EDM apparatus has an indexable rotary turret with four work heads secured thereon to locate a pair of nozzle body blanks with their longitudinal axes in spaced parallelism; and either three or four compound cross and longitudinal slide assemblies carrying grinding tools, lapping tools or non-contact machining tools which work on the blanks to machine the face and to form a valve guide bore and a valve seat shaped as a frustrum of a cone whose axis is concentric with the bore, the valve seat cone surface having a small end diameter to large end diameter ratio in the order of 1–50.

6 Claims, 15 Drawing Figures

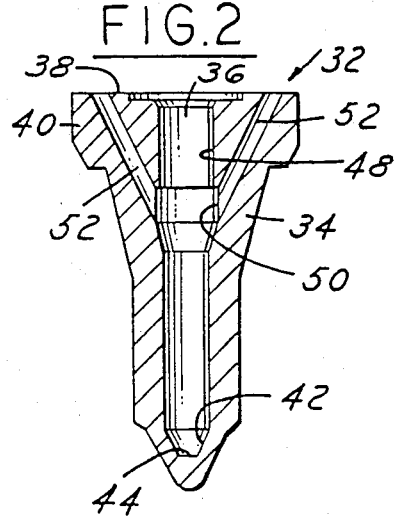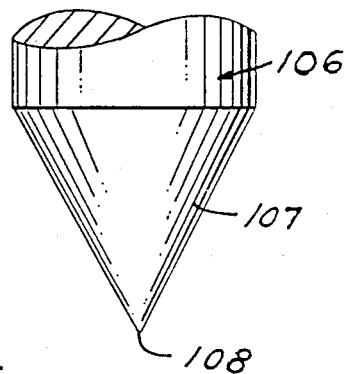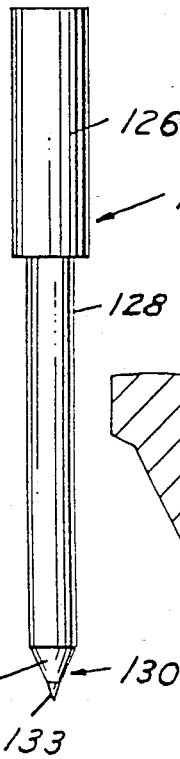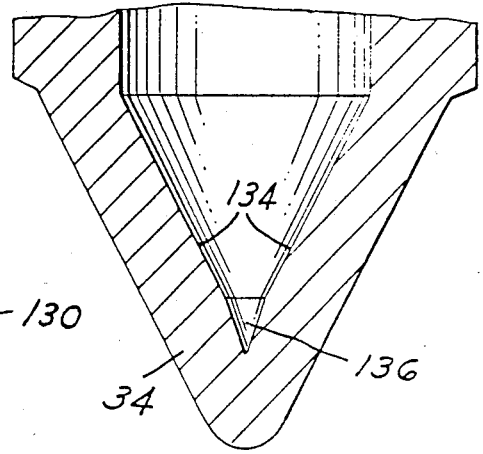

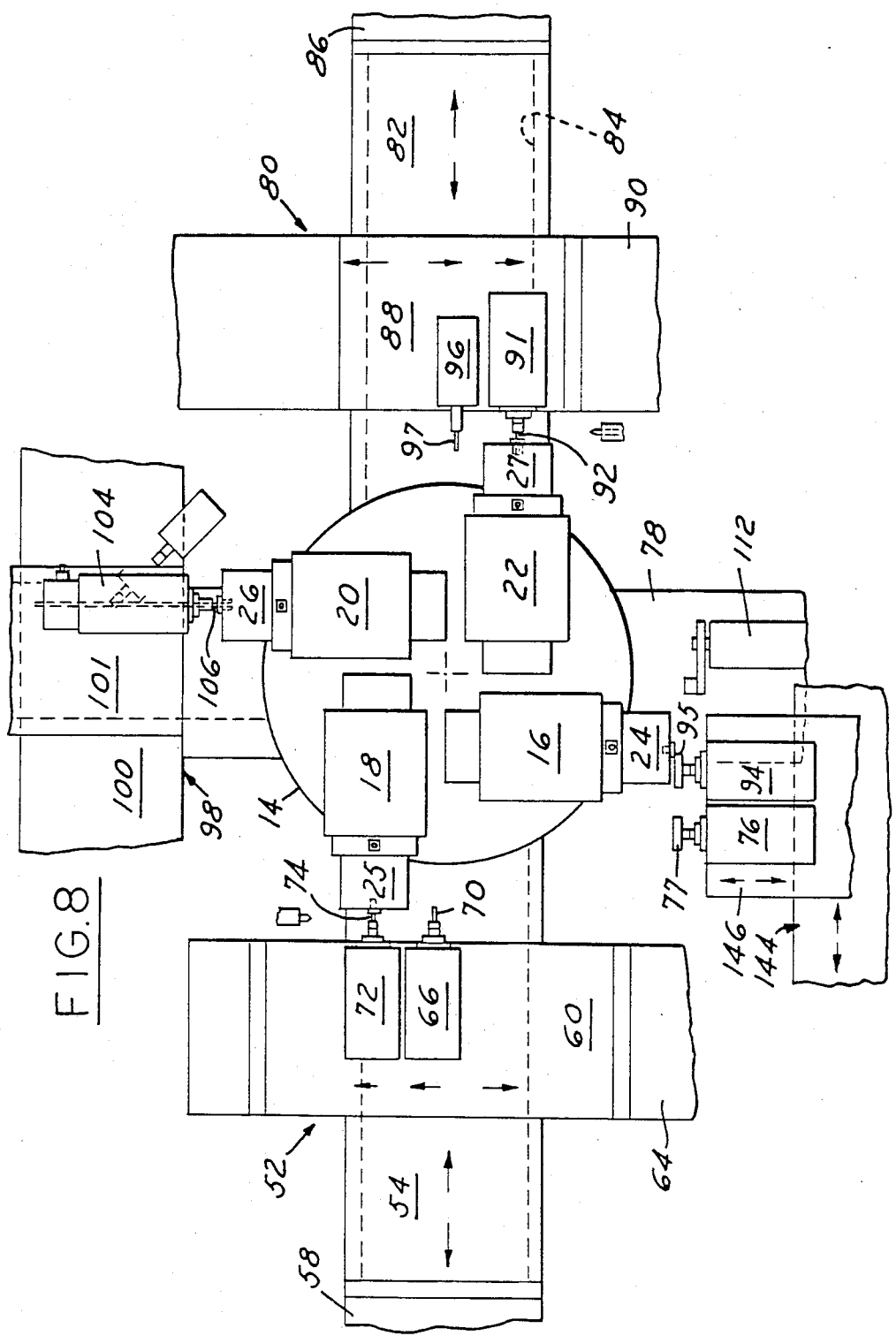

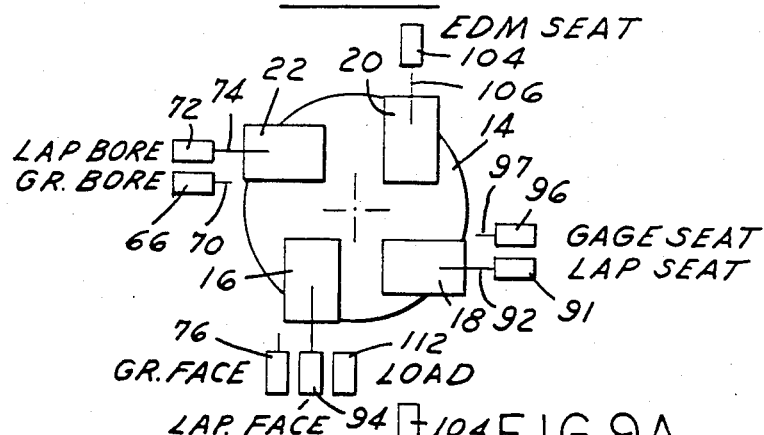
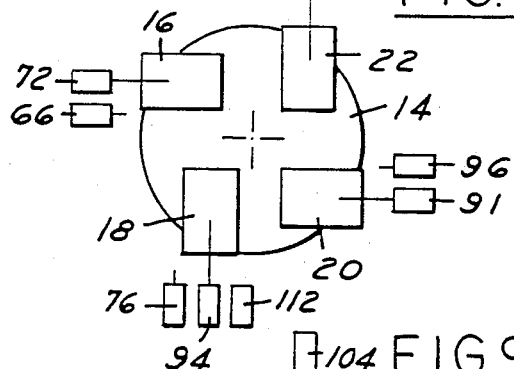
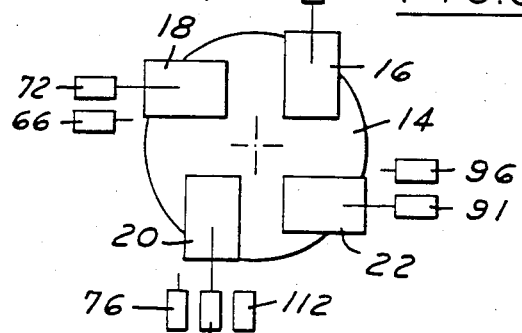
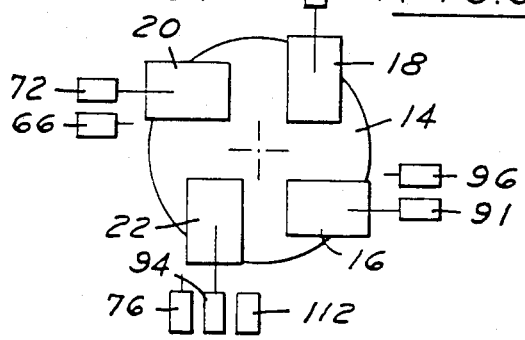

COMBINED BORE SEAT FACE GRINDING, EDM AND LAPPING METHOD FOR FINISHING FUEL INJECTOR NOZZLE BODIES

TECHNICAL FIELD

This invention relates to apparatus and a method for finishing fuel injector nozzle bodies and more particularly to apparatus and a method for forming a fuel injector nozzle body with a concentric and square valve guide bore, face and valve seat of frustrum cone shape with a reduced small end diameter.

BACKGROUND ART

Prior art fuel injector nozzle bodies have a valve guide bore in which a needle valve is reciprocated between open and closed positions with respect to an interior valve seat shaped as a frustrum of a cone. The valve seat is spaced from an injector nozzle body sack in communication with fuel holes for distributing the fuel. Injector nozzle bodies have had a hemispherically configured sack region formed the nozzle downstream of the seat to supply fuel to the spray holes when the needle valve is opened. In the past the small diameter end of the valve seat was established by the dimensions of the sack region and was such that metal grinding could be used to finish such valve seats.

Machining methods of U.S. Pat. Nos. 2,377,159 and 3,783,225 disclose use of cone-shaped electrodes to remove material from a workpiece to form a shaped hole in the workpiece. There is no suggestion of apparatus or methods including combined grinding and non-contact machining to form a sackless fuel injector nozzle body with a precision formed valve seat.

U.S. Pat. Nos. 3,072,777 and 3,614,371 disclose apparatus for moving a non-contact machining electrode transversely of a workpiece to form an opening therein. The apparatus does not include means for concurrently grinding and non-contact machining two or more workpieces by the apparatus and method of the present invention.

Anticipated emission regulations require reduction of such emissions by requiring that sacks of fuel injector nozzles be reconfigured to a V-shape to have a reduced fuel containing space in the nozzle when the valve needle closes while retaining a valve seat configured as a frustrum of a cone. Such reconfigured sack regions result in a significant reduction in the small end diameter of the valve seat. Consequently, the small end diameter of a conical grinding wheel used to grind the seat also is reduced in diameter significantly. As a result, the surface speed of the abrasive grains in the small end diameter of the conical grinding wheel is too low for efficient grinding.

BACKGROUND OF THE INVENTION

A general object of the invention is to provide an improved method and apparatus for precision finishing the face and the interior of a fuel injector nozzle body; the apparatus including a combined operation of bore grinding, non-contact metal machining of the valve seat, and face grinding in the same machine so as to obtain concentricity between the bore and seat and squareness with the face of the nozzle body. In particular, the apparatus includes an indexable rotary table carrying a plurality of work holders each carrying a fuel injector nozzle body. The machine further includes a plurality of cross and longitudinal slide mounted finishing tools including bore grinding and lapping spindles, face grinding and lapping spindles, seat lapping and gaging spindles, and an EDM seat machining station. The indexable work heads are precisely aligned with the spindle so that a cylindrical grinding wheel will grind the valve guide bore surface. Thereafter the workhead with the ground bore is precisely positioned by the same index system to precisely EDM finish the valve seat. The EDM electrode is insertable into the formed nozzle interior to form a precision surface on the valve seat which is concentric to the valve guide bore to cooperate with a later assembled needle valve to produce a reduced volume "sackless" fuel space between the valve seat and spray holes to control fuel dribble therefrom when the valve is closed.

The method of the present invention includes indexing a fuel injector nozzle body blank with a center cut bore and pre-formed valve seat with a V-shaped surface in the shape of a frustrum of a cone on a single machine platform to maintain precise axial alignment and face squareness while indexing through three or four machining stations, including a non-contact machining station that forms the V-shaped surface by non-contact machining to define a minimal nozzle fuel volume to reduce fuel dribble.

Other advantages of the present invention will be readily appreciated as the same becomes better understood by reference to the following detailed description when considered in connection with the accompanying drawings, wherein:

BRIEF DESCRIPTION OF THE DRAWINGS

FIG. 2 is a cross-sectional view of a fuel injector nozzle body blank to be finished by the present invention;

FIG. 3 is an enlarged fragmentary side view of a typical electrode used with the present invention;

FIG. 4 is a cross-sectional view of a fuel injector nozzle body finished by the present invention;

FIG. 5 is a side view of a punch used on the blank of FIG. 2 in preparation for the operation of the present invention;

FIG. 6 is an enlarged fragmentary cross-sectional view of the blank of FIG. 2 after being pre-formed by the punch of FIG. 5;

FIG. 8 is a top plan view of an alternate embodiment of the FIG. 1 apparatus; and FIGS. 9 through 9C are diagrammatic views of the operating positions of the apparatus of FIG. 8.

DESCRIPTION OF THE PREFERRED EMBODIMENT

Figure 1:
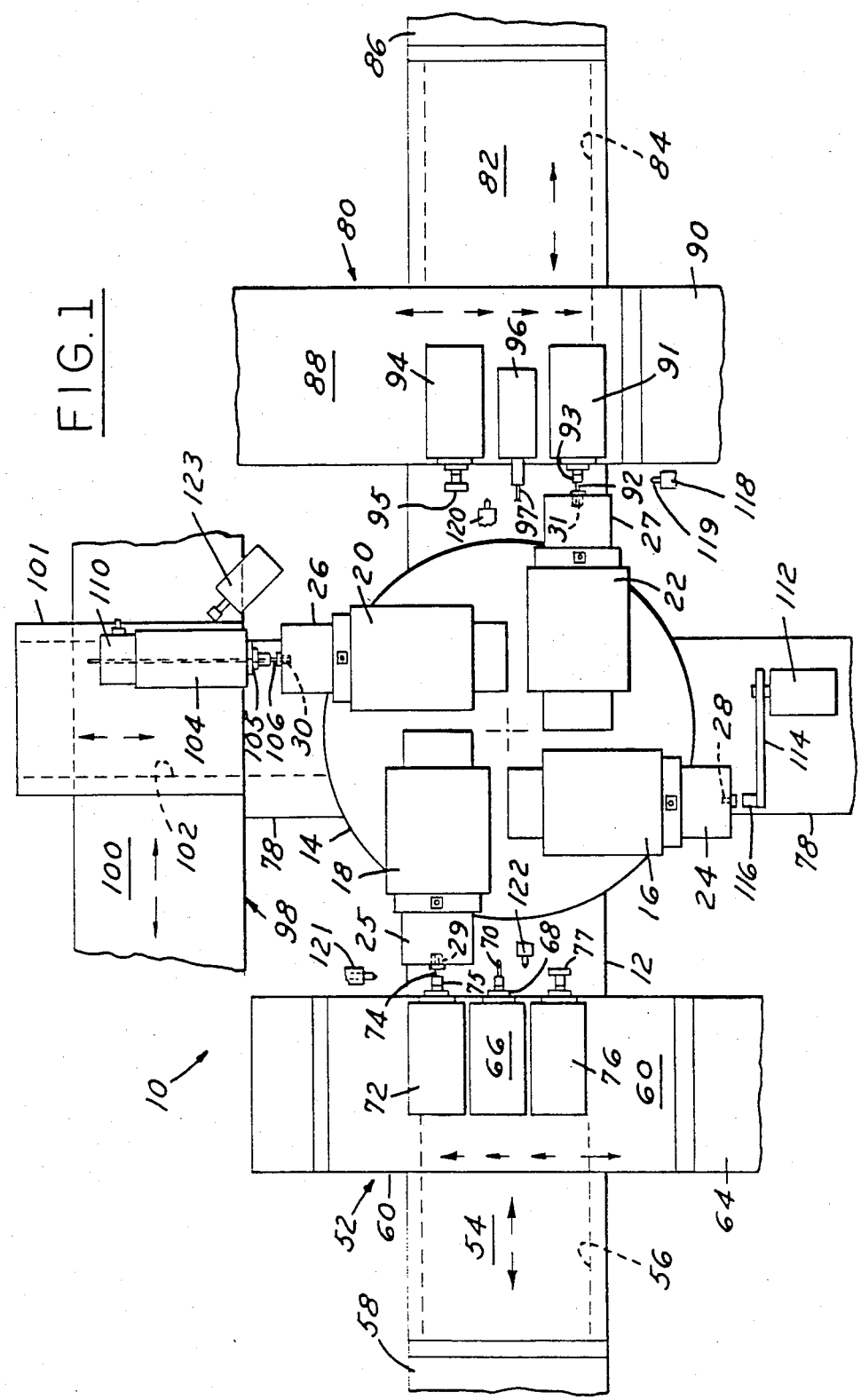
FIG. 1 is a top plan view of apparatus for practicing grinding and electrical discharge machining and lapping on the nozzle body of a fuel injector in accordance with the present invention.

Referring now to the drawings in greater detail, FIG. 1 illustrates a combination grinding, lapping and EDM apparatus 10, including a machine base represented at 12, having a bridge that rotatably supports an indexable turret 14. The turret 14 is commercially available and may include a rotary drive system including a D.C. servo-controlled motor (not shown) that can be precisely controlled by a servo power system including position resolvers of the type more particularly discussed in U.S. Pat. No. 4,419,612, issued Dec. 6, 1983 with a common assignee.

The turret 14 carries four work holders 16, 18, 20 and 22, each having an end fixture 24, 25, 26 and 27, respectively, with recessed bores 28, 29, 30 and 31, respectively, for receiving a nozzle body blank 32 of the type shown in FIG. 2.

Each blank 32 more particularly includes a housing 34 with a pre-formed bore 36 extending from the face 38 of a locating flange 40 to a blind hole formed by a cone-shaped interior nozzle surface 42 with an end surface 44. The surfaces 42 and 44 define a punch engaging surface which is cold-formed and non-contact machined to define a sackless spray tip, as will be explained. The bore 36 includes a needle valve guide surface 48 and a transition section 50 which communicates with fuel supply passages 52 in the nozzle body.

The apparatus further includes a compound slide unit 52 with a Z-axis slide 54 supported for reciprocation in a slide way 56 by a ball screw actuator including a servo-controlled D.C. motor drive 58 and control system. The slide unit 52 also has an x-axis slide 60 supported for reciprocation in a slide way (not shown) mounted on the Z-axis slide 54. The drive for the X-axis slide 60 is a ball screw actuator including a servo-controlled D.C. motor drive 64. The servo-controlled motors and ball screw actuators are of the type set forth in the above referenced U.S. Pat. No. 4,419,612, or its equivalent. The slide 60 carries a high speed bore grinding spindle 66 having motor means that drives a rotatable head 68 on which is located a cylindrical grinding wheel 70 that has abrasive particles on its outer periphery that finish the valve guide bore 36. A guide bore lap spindle 72 is also carried on the X-axis slide 60 and has a cylindrical lap 74 extending from a guide member 75, with its axis parallel to the axis of the cylindrical grinding wheel 70. Additionally, a face grinding spindle 76 is carried on the X-axis slide 60 and has a disc grinding wheel 77 extending therefrom, with abrasive particles on the outer face thereof for grinding the face of the nozzle body blank 32.

A fixed worktable 78 on the bridge extends parallel to the X-axis slide 60 and to a second compound slide unit 80 on the opposite side of the bridge from the compound slide unit 52. The compound slide unit 80 includes a Z-axis slide 82 driven in a slide way 84 by suitable drive means 86, such as the previously described servo-controlled D.C. motor driven ball screw apparatus. An X-axis slide 88 of the unit 80 is supported for reciprocation in a slide way (not shown) mounted on the Z-axis slide unit 82, and driven by suitable drive means 90.

The slide 88 carries a valve seat lap spindle 91 with a frusto-conical lap 92 extending from a guide member 93; a face lapping spindle 94 with a suitable lap 95 extending therefrom; and a valve seat gage apparatus 96 including a movable probe 97 to indicate the final valve seat geometry, all with their axes parallel to the working axes of all previously described metal finishing tools.

A further compound slide unit 98 is positioned intermediate the slide units 52 and 80 and perpendicular thereto and across the worktable 78. The unit 98 includes a Z-axis slide 100 driven in a slide way (not shown) by suitable drive means (not shown). An X-axis slide 101 is supported for reciprocation in a slide way 102 mounted on the Z-axis slide unit and driven by suitable drive means (not shown).

An electrical discharge machining (EDM) apparatus 104 is carried by the X-axis slide 101. The apparatus 104 includes a chuck 105 for feeding an electrode 106 (FIG. 3) into the valve guide bore 36 along the ground bore axis. The electrode 106 has a V-shaped conical surface 107 with a tip 108.

The electrical discharge machining apparatus 104 further includes a suitable housing having a dielectric storage tank (not shown) into which dielectric fluid from the spark gap may be drained. The turret 14 is positioned on the base bridge to locate a workpiece, such as the fuel injector nozzle body blank 32 (FIG. 2) in which a nozzle interior volume is to be non-contact machined. Electrode feed structure, represented at 110, is secured to and insulated from the slide 101. The electrode feed structure 110 is controlled by a trigger circuit and control circuit which may be included in a control box (not shown) which further includes suitable controls for the slide and indexing table drives to produce the machine positions to be described.

The dielectric storage tank and associated dielectric fluid supply and return structure form no part of the present invention and will not therefore be considered in detail herein. It is only necessary that apparatus be provided to supply a dielectric fluid between the electrode 106 in the electrode feed structure and the workpiece 32 when positioned by the indexable turret 14.

A loader 112 (FIG. 1) is supported on the worktable 78. It includes a swing arm 114 having a suitable socket 116 to receive a blank 32 in a pre-load position in which the work holders 16, 18, 20 and 22 will clear the loader 112 as the turret 14 is rotatably indexed to its various machine operating positions. The loader 112 is driven by suitable drive means (not shown) on the axis Y (FIG. 1), following the indexing of the turret, to load a blank 32 in respective work holder bores 28, 29, 30 or 31.

A dresser assembly 118 is fixedly secured to the apparatus 10 and includes a single-point dresser tool 119 for dressing the lap 92. Suitable other dressers, represented at 120, 121, 122 and 123, may be fixedly secured to the apparatus 10 to respectively dress the laps 95 and 74, the grinding wheels 70 and 77, and the electrode surface 107 (FIG. 3).

As indicated previously, the pre-formed blank 32 is first shaped to produce a reduce fuel sack region in the fuel injector spray tip. This is accomplished by a punch 124 (FIG. 5) which is positioned in axial alignment with the open end of the bore 36 of the fixtured blank 32. The punch 124 includes a shank 126 and a cylindrical extension 128. The cone-shaped tip 130 is formed on the end of the extension 128, and includes a truncated cone surface 132 with a cone extension 133. Suitable slide structure (not shown) moves the punch 124 into the bore 36 to cause the tip 130 of the punch to cold form the surfaces 42 and 44 to produce a conical-shaped interior rough surface 134 with a relief space 136 (FIG. 6).

Following the cold forming of surfaces 42 and 44 into the surfaces 134 and 136, the slide structure retracts the punch 124 from the blank 32, and suitable spray holes 138 (FIG. 4) are later formed to intersect the relief space 136.

Figure 7:
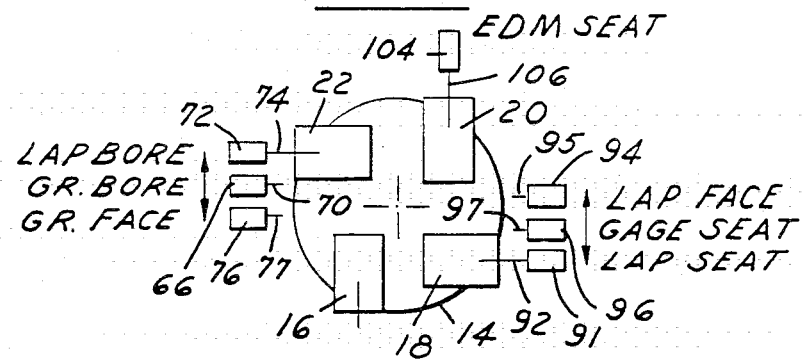
FIGS. 7 through 7C are diagrammatic views of the operating positions of the apparatus of FIG. 1.
Figure 7A:
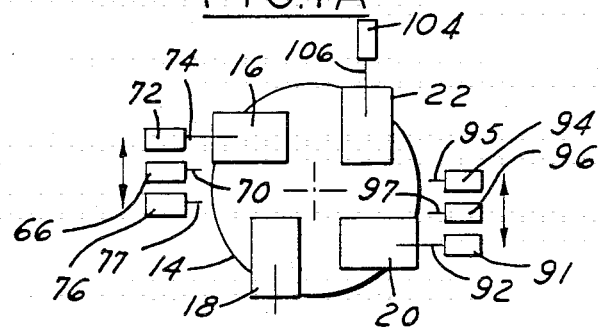
Figure 7B:
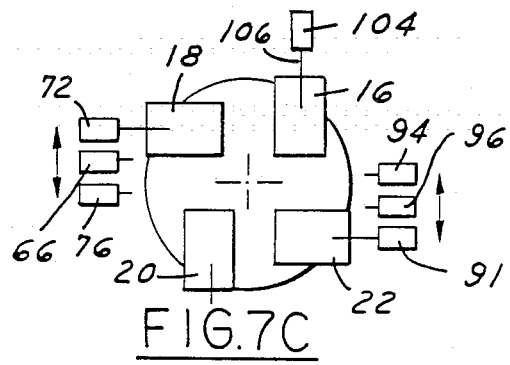
Figure 7C:
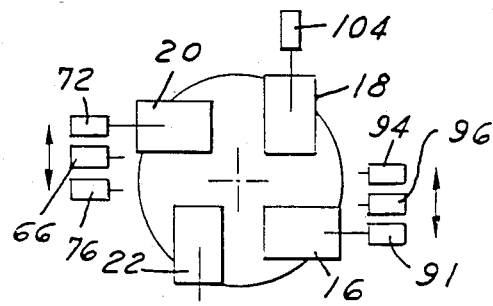

Thereafter, the machine operations finish the fuel injector nozzle body blanks 32 to include frustrum-of-a-cone-shaped valve seats 140 (FIG. 4) include positioning the machine components as shown in FIGS. 7 through 7C. The apparatus 104 (FIG. 1) has suitable electrolyte supply and return means to remove metal eroded from the cone-shaped rough surface 134 (FIG. 6) to form the valve seat 140 (FIG. 4) during the non-contact machining of the valve seat. The cone-shaped interior surface 134 is configured to provide a gap between the surface 107 and its tip 108 and the nozzle body interior 134 to prevent excessive electrode wear. In the position shown in FIG. 7, the indexable turret 14 positions the work holders 16, 18, 20 and 22 in four 90° apart operational positions. In the FIG. 7 position the machine is controlled to cause the compound slides 52, 80 and 98 to move the finishing tools to the fixed location of their respective dressers for truing the shapes of the grinding wheels 70 and 77, laps 74, 92 and 95, and electrode 107 in preparation for metal finishing steps. The loader 112 places a blank 32 into the end fixture 24 of the work holder 16, and the probe 97 of the valve seat gage apparatus 96 inspects a previously machined and lapped blank to determine if further lapping of the seat is required to meet predetermined finished part specifications and dimensional tolerances. The machine control is then pre-set to carry out the necessary operations.

Once the workholder 16 is loaded while in the FIG. 7 position, the machining sequence is initiated by indexing the turret 14 to the FIG. 7A position. The locating axes of the work holders 16 and 20 are always parallel to one another, as are the locating axes of the work holders 18 and 22, which are always perpendicular to the locating axes of work holders 16, 20. The compound slides 52, 80 and 98 are moved to align the cylindrical grinding wheel 70 of the high speed bore grinding spindle 66 with a blank 32 in the holder 16, the electrode 106 of the EDM apparatus 104 with a blank 32 in the holder 22, and the lap 92 of the spindle 91 with the blank 32 in the holder 20. The respective blanks 32 are simultaneously machined by controlling the compound slides 52, 80 and 98 for X-Z axis movement of the working grinding wheel 70, the EDM electrode 106, and the lap 92, while a finished blank 32 is unloaded from the work holder 18 and a rough blank 32 loaded thereon. While the turret 14 remains in this position, the slides 52 and 80 are moved along their Z axes to respectively lap the bore with the lap 74 and gage the seat with the probe 97, and then to grind the face with the grinding wheel 77 and lap the face with the lap 95, of the blanks in the respective work holders 16 and 20. Following the machining cycle in the FIG. 7A position, the working tools are retracted from the blanks 32 and the turret 14 and work holders 16, 18, 20 and 22 are advanced to the FIG. 7B position.

In the FIG. 7B position, the previously bore lapped and face ground blank in work holder 16 will now have its valve seat machined by the electrode 106, while the electrode machined blank in work holder 22 has its seat lapped and gaged and its face lapped. Concurrently, a new blank is loaded in the work holder 16, and the blank in the work holder 18 will have its bore ground and lapped, and its face ground. Following these operations, the compound slides 52, 80 and 98 retract the respective tools from the blanks and the indexable turret is rotated ninety degrees to the FIG. 7C position.

In the FIG. 7C position, the respective operations are repeated for the next successive blanks, and a completely finished blank 32 is unloaded from the work holder 22 and a new blank loaded thereon.

Concentricity of the valve guide bore and the valve seat, and squareness of the nozzle body face, are obtained because of the fact that the fuel injector nozzle body continues to be held in the same chuck and rotated on the same workhead bearings during all bore and seat metal removal operations.

The differences between the grinding and EDM apparatus embodiments for finishing fuel injector nozzle bodies and the operations at the various work stations are dependent upon particular fuel injector nozzle body dimensional and performance requirements. Certain machines may omit seat gaging and/or face grinding and lapping. Which ones of given operations are performed simultaneously on one or more pairs of work heads will result in machining cycles which may be shorter or longer depending upon the number of finishing operations that are required for a given valve design and/or the number of simultaneous operations that can be performed in each of a plurality of indexed positions of the turret 16.

The resultant fuel injector nozzle body (FIG. 4) is thereby configured to have an interior end surface and valve seat 140 as a frustrum of a cone with small end diameter to large end diameter ratio on the order of 1-50 that will position a needle valve 142 to be closely spaced with the nozzle interior surface to define a reduced volume space with a limited fuel capacity following valve closure. Accordingly, the nozzle body in an assembled fuel injector assembly will reduce heretofore fuel dribble problems produced in nozzles with hemispherically configured fuel sacks.

The embodiment shown in FIG. 8 and diagrammatically in FIG. 9 is similar to the FIGS. 1 and 7 arrangement, except that an additional compound slide 144 is included at the unload/load station, parallel to the compound slide 98, on the opposite side of the turret 14. In this embodiment the face grinding spindle 76 from the compound slide 52 of the FIG. 1 embodiment, and the face lapping spindle 94 from the compound slide 80 of the FIG. 1 embodiment are mounted on an X-axis slide 146 supported on the additional compound slide 144 adjacent the loader 112. As such, the face of the blank is ground and lapped concurrently with the grinding and lapping operations on the bore, and the lapping and gaging operations on the seat.

INDUSTRIAL APPLICABILITY

It should be apparent that the invention provides an efficient means for accurately and concurrently performing the grinding of fuel injector nozzle body bores and faces, EDM roughing of the seats thereof, and then lapping the three respective surfaces, along with gaging the finished seats.

This invention has been described in an illustrative manner, and it is to be understood that the terminology which has been used is intended to be in the nature of words of description rather than of limitation.

Other modifications and variations of the present invention are possible in light of the above teachings. It is therefore to be understood that other embodiments of apparatus and method may be practiced otherwise than as specifically described herein and yet remain within the scope of the appended claims.

The embodiments of the invention in which an exclusive property or privilege is claimed are defined as follows:

1. A method for concentrically forming a valve guide bore and a valve seat in respective fuel injector nozzle body blanks having a center-cut bore terminating in a blind hole defined in part by a pre-formed cone shaped surface to locate a needle valve component therein so as to reduce the fuel dribble capacity of the nozzle body, said method comprising the steps of alternately grinding and lapping the center cut bore surfaces to the blind hole of one blank, concurrently respectively alternately concentrically lapping and gaging a valve seat surface of a second blank, and non-contact machining a valve seat surface of a third blank by use of electrode means concentric with the valve guide bore during the time period that the other operations are being performed.

2. The method described in claim 1, and pre-forming the valve seat as a frustrum of a cone to have a small end diameter to large end diameter ratio on the order of 1–50.

3. In the method of claim 2, non-contact machining the valve seat surface by use of a comsumable spark gap electrode including a conical surface closely spaced from the pre-formed valve seat surface.

4. The method described in claim 1, and rotating said lapped bore and valve seat blanks into alignment with respective unloading/loading and seat gaging means.

5. The method described in claim 1 and following said bore and valve seat machining operations with face grinding and lapping operations on two nozzle body blanks so as to be square with the bore and valve seat.

6. The method described in claim 1 and concurrently grinding and/or lapping the faces of two nozzle body blanks so as to be square with the bore and valve seat.

* * * * *